July 7, 1925. 1,544,907

J. HEWEL

ROTARY CULTIVATOR

Filed Oct. 6, 1924 2 Sheets-Sheet 1

Inventor
Joseph Hewel

Witness

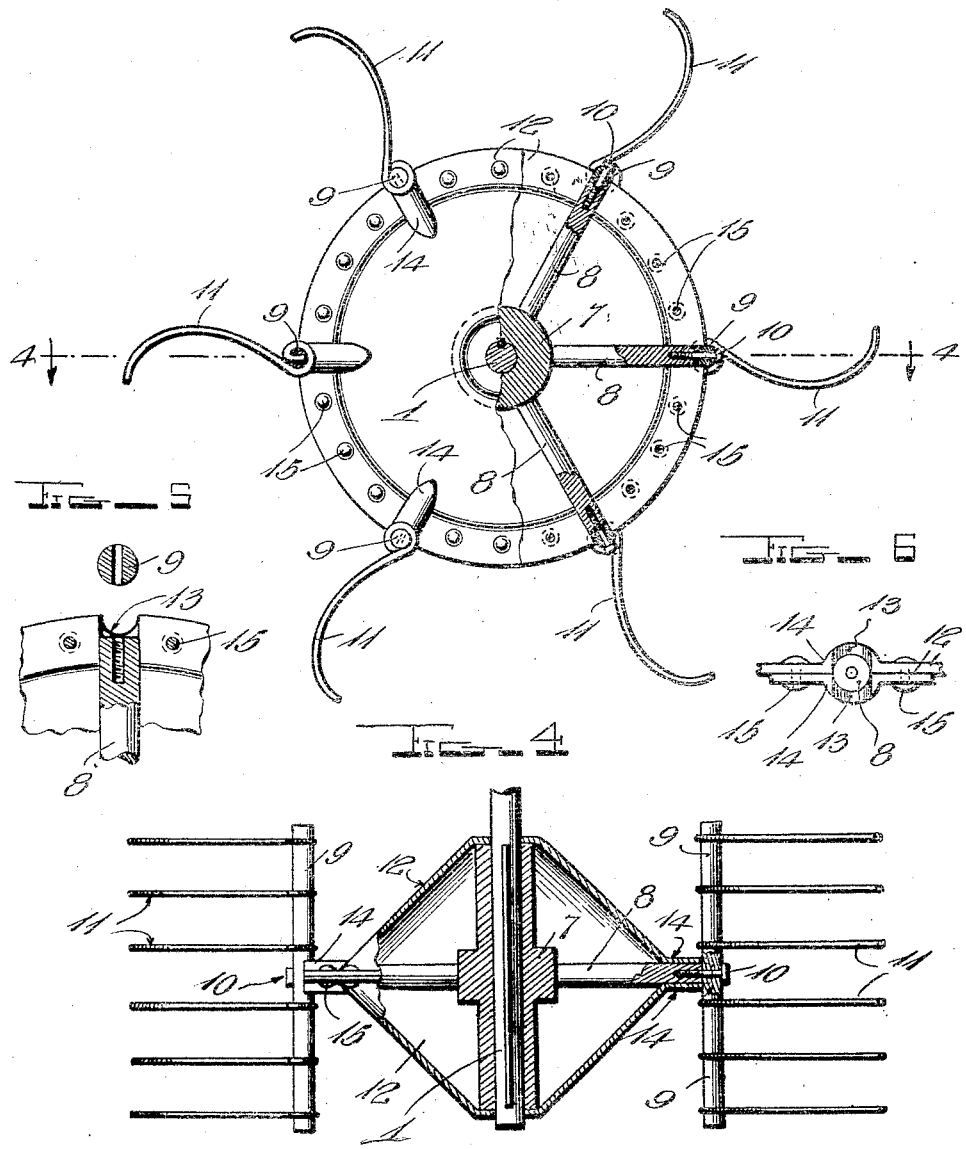

Patented July 7, 1925.

1,544,907

UNITED STATES PATENT OFFICE.

JOSEPH HEWEL, OF ASHTABULA HARBOR, OHIO.

ROTARY CULTIVATOR.

Application filed October 6, 1924. Serial No. 742,019.

*To all whom it may concern:*

Be it known that I, JOSEPH HEWEL, a citizen of the United States, residing at Ashtabula Harbor, in the county of Ashtabula and State of Ohio, have invented certain new and useful Improvements in Rotary Cultivators; and I do declare the following to be a full, clear, and exact description of the invention, such as will enable others skilled in the art to which it appertains to make and use the same.

My invention aims to provide a simple and efficient earth working machine which will effectively cultivate and substantially pulverize the soil, by subjecting it to the action of a plurality of implements, preferably spring tines, carried by a driven wheel.

In carrying out the above end, spokes are provided radiating from a hub on a driven shaft, and cross bars are detachably connected with the outer ends of said spokes, said cross bars carrying the tines or the like for cultivating the earth; and a further object is to associate a pair of disks with the spokes and cross bars, in such a manner as to hold said spokes rigidly in spaced relation and to prevent canting of the cross bars.

A further object is to provide a device which will effectively remove clods of earth or stones from rows of corn or other vegetation and deposit them at the sides of the rows, so that they will not prevent the corn or the like from breaking through the surface of the earth.

With the foregoing in view, the invention resides in the novel subject matter hereinafter described and claimed, the description being supplemented by the accompanying drawings.

Figure 3 is an enlarged elevation partly in section, showing the construction of the wheel.

Figure 4 is a horizontal sectional view taken approximately on line 4—4 of Fig. 3.

Figure 5 is a detail sectional view similar to a portion of Fig. 3, but illustrating one of the cross bars removed from its carrying spoke.

Figure 6 is a fragmentary edge view of the wheel.

Figure 1:
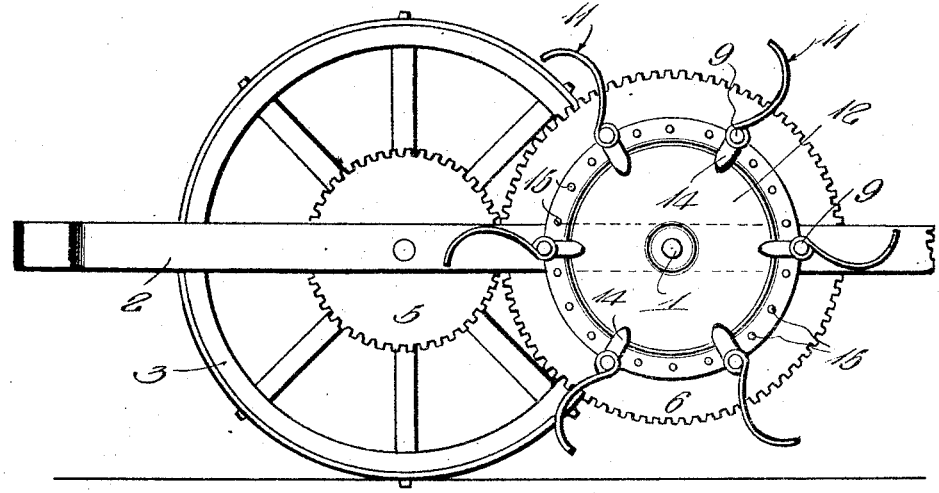
Figure 1 is a side elevation of a machine embodying my invention.
Figure 2:
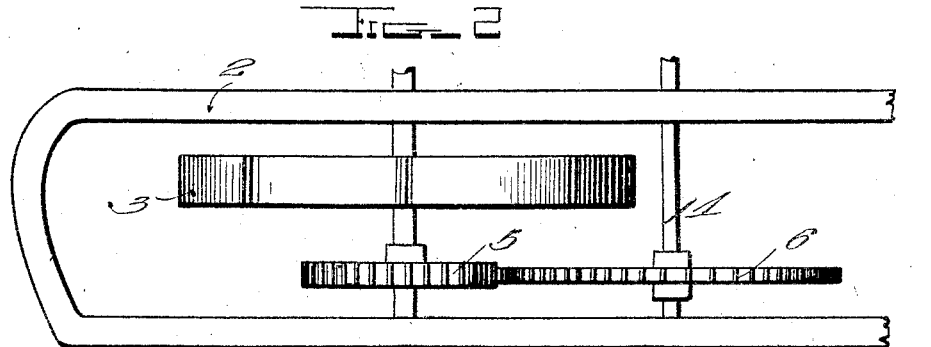
Figure 2 is a partial plan view.
Figure 2:
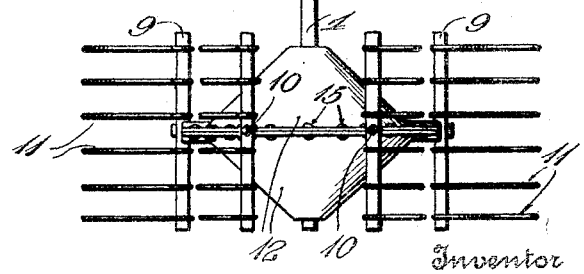

In the drawings above briefly described, the numeral 1 designates a transverse shaft which is mounted rotatably on an appropriate frame, a portion of which is indicated at 2. This frame is provided with a ground wheel 3 and with an axle 4 driven by said wheel, and intermeshing gears 5 and 6, are used to transmit motion from the axle 4 to the shaft 1. Mounted upon this shaft, I have shown a cultivating wheel constructed in accordance with my invention.

The numeral 7 designates an appropriate hub secured on the shaft 1 and provided with radiating spokes 8 to whose outer ends cross bars 9 are detachably secured by bolts, cap-screws or the like 10, these bars being provided with a plurality of tines or other desired implements 11 for working the earth as the wheel is driven. Spring tines are preferably used and they may be secured in any desired manner to the bars 9.

Mounted on the shaft 1 and having their centers disposed at the ends of the hub 7, are two disks 12 which converge to their peripheral edges, said edges being preferably spaced outwardly to some extent from the ends of the spokes 8 and being formed with transversely alined notches 13 which snugly receive the bars 9 and prevent the latter from turning around the screws or the like 10. The peripheral portions of the two disks are preferably stamped outwardly at intervals as indicated at 14, to provide seats which snugly receive the spokes 8, the disks being secured together by rivets or the like 15 between said spokes.

The disks 12 effectively brace the spokes 8 against bending or springing in any manner and the notches 13 of said disks overcome any liability on the part of the cross bars 9 to swing about the screws or the like 10, when the wheel is in operation. By removing the screws or other fasteners 10, any desired number of the cross bars 9 and the tines or the like carried thereby, may be detached, for instance to make any necessary repairs or to substitute other forms of implements.

When the device is in operation, it effectively weeds and cultivates the soil and substantially pulverizes it, and as excellent results may be obtained from the details disclosed, they may well be followed. However, within the scope of the invention as claimed, minor changes may be made.

If desired, the machine may be driven so that the tines 11 lightly work the earth along a row of sprouted seeds. Any clods or stones on the row will then be lifted by the tines and dropped onto the disks 12 and the latter will laterally deflect them to the sides of the row, so that they will not prevent the sprouts from breaking through the surface of the earth.

I claim:

1. A device of the class described comprising a wheel, cross bars secured to the periphery of said wheel and projecting oppositely therefrom, and a plurality of curved spring teeth carried by each of said cross bars for working the earth when the wheel is driven.

2. A device of the class described comprising a hub, a plurality of spokes radiating therefrom and having cross arms at their outer ends adapted to carry earth working implements, and a pair of disks having their centers disposed at the ends of said hub, said disks converging to their peripheral edges and having said edges secured together between said spokes to hold the latter in properly spaced relation.

3. A device of the class described comprising a hub, a plurality of spokes radiating therefrom, a pair of disks having their centers disposed at the ends of said hub, said disks converging to their peripheral edges and having such edges outwardly stamped at intervals to form seats receiving said spokes, the outer ends of said outwardly stamped portions being formed with notches, cross bars extending across the outer ends of said spokes and having their intermediate portions received in said notches, said bars being adapted to carry earth working implements, means detachably securing said cross bars to said spokes, and means securing the edges of said disks together between said spokes.

4. A device of the class described comprising a pair of conical axially alined disks which converge from their centers to their peripheral edges, means for rotating said disks, a plurality of cross arms at said peripheral edges of the disks and rotatable bodily therewith, and curved spring tines projecting outwardly from said cross arms.

In testimony whereof I have hereunto affixed my signature.

JOSEPH HEWEL.